United States Patent
Yamazaki et al.

(10) Patent No.: US 8,660,746 B2
(45) Date of Patent: Feb. 25, 2014

(54) ACCELERATOR PEDAL APPARATUS

(75) Inventors: Shigeru Yamazaki, Kanagawa (JP); Hiromutsu Touhachi, Kanagawa (JP)

(73) Assignee: Mikuni Corporation, Tokyo (JP)

( * ) Notice: Subject to any disclaimer, the term of this patent is extended or adjusted under 35 U.S.C. 154(b) by 182 days.

(21) Appl. No.: 13/307,325

(22) Filed: Nov. 30, 2011

(65) Prior Publication Data

US 2012/0143441 A1 Jun. 7, 2012

(30) Foreign Application Priority Data

Dec. 1, 2010 (JP) ................................ 2010-268437

(51) Int. Cl.
*G05G 1/30* (2008.04)
*G06F 7/00* (2006.01)

(52) U.S. Cl.
USPC ............................................ 701/36; 74/513

(58) Field of Classification Search
None
See application file for complete search history.

(56) References Cited

U.S. PATENT DOCUMENTS

| 7,022,045 | B2 * | 4/2006 | Yone | 477/120 |
| 7,308,839 | B2 * | 12/2007 | Hijikata | 74/514 |
| 7,715,972 | B2 * | 5/2010 | Kuge | 701/96 |
| 2005/0209743 | A1 * | 9/2005 | Egami | 701/1 |
| 2006/0195245 | A1 * | 8/2006 | Kobayashi et al. | 701/70 |
| 2007/0276577 | A1 * | 11/2007 | Kuge et al. | 701/96 |
| 2010/0250084 | A1 * | 9/2010 | Takiguchi et al. | 701/70 |

FOREIGN PATENT DOCUMENTS

| JP | 2006-168614 | * | 6/2006 |
| JP | 2010-52468 | * | 3/2010 |
| JP | 2010-111379 | | 5/2010 |
| WO | WO2009/136512 A1 | * | 11/2009 |

* cited by examiner

*Primary Examiner* — Michael J Zanelli

(57) ABSTRACT

An accelerator pedal apparatus includes a torque motor which generates operational reaction force corresponding to operation of an accelerator pedal, an accelerator pedal position sensor (APS) which detects an accelerator opening rate of an accelerator pedal and outputs the accelerator opening rate to an engine control unit (ECU) being an upper device, and a control unit which applies the operational reaction force as controlling driving of the torque motor. The control unit applies the operational reaction force as controlling driving of the torque motor based on the accelerator opening rate when being commanded to apply the operational reaction force by the ECU.

7 Claims, 8 Drawing Sheets

FIG. 8 – Related Art
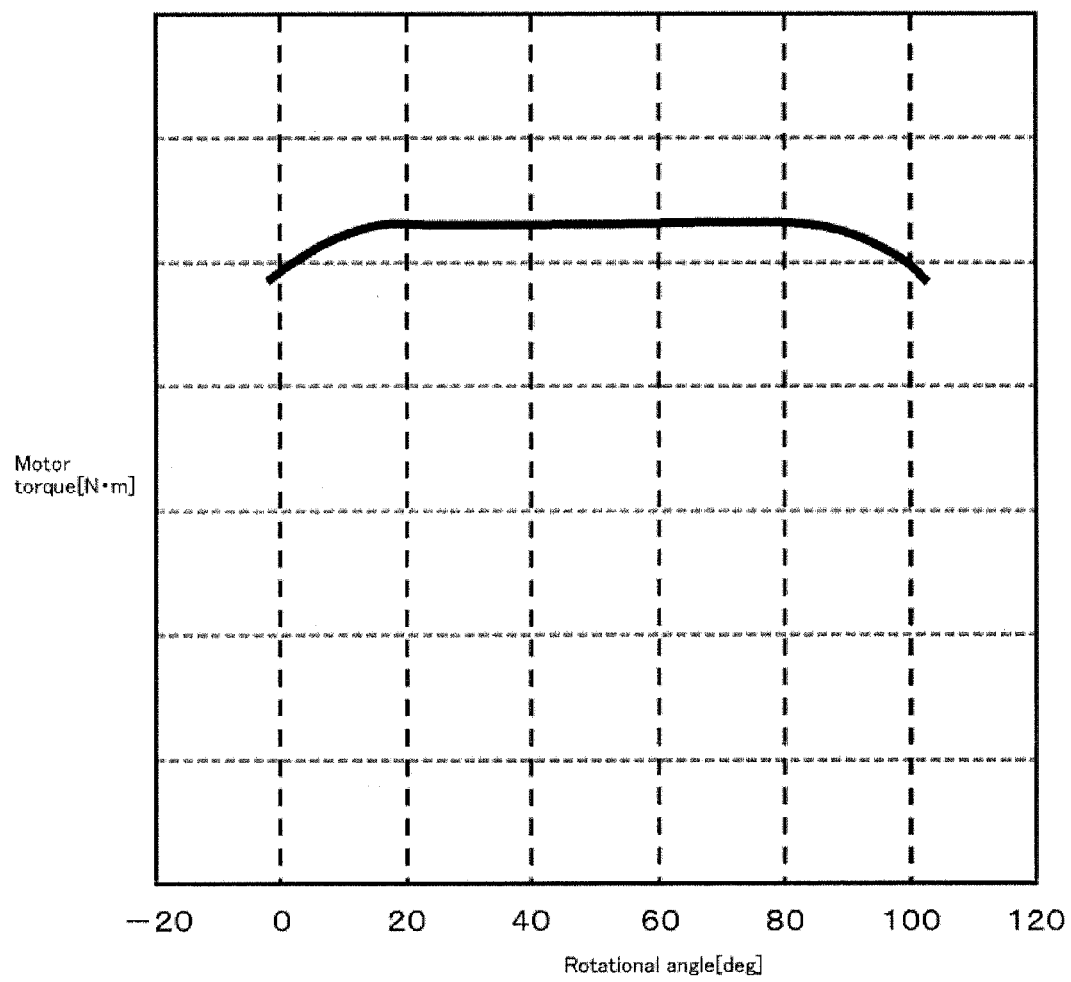

ACCELERATOR PEDAL APPARATUS

CROSS-REFERENCE TO RELATED APPLICATIONS

This application claims the priority benefit of Japanese Patent Application No. 2010-268437, filed Dec. 1, 2010, in the Japanese Patent Office, the disclosure of which are incorporated herein by reference.

BACKGROUND

1. Field

The present disclosure relates to an accelerator pedal apparatus which is applied for a vehicle such as an automobile, and in particular, relates to an accelerator pedal apparatus including an active control mechanism which draws driver's attention by varying operational reaction force against accelerator pedal operation.

2. Description of the Related Art

Recently, accelerator pedal apparatuses including an active control mechanism which draw a driver's attention by varying operational reaction force against accelerator pedal operation have been developed and applied for vehicles such as automobiles. For example, Japanese Patent Publication No. 2010-111379 proposes an accelerator pedal apparatus capable of achieving miniaturization with a simple structure, allowing a hysteresis generating mechanism and an active control mechanism utilizing a torque motor as a drive force to surely function in an independent manner, and performing active control with a quick response.

FIG. 8 is a graph indicating relation between a rotational angle of a torque motor and motor torque according to the related art.

As illustrated in FIG. 8, the torque motor has a characteristic that the outputted motor torque varies in accordance with the rotational angle of the torque motor even when the same current is applied. Therefore, for generating desired motor torque by utilizing the torque motor as a drive source of the active control mechanism, it has been required to arrange a motor position sensor (MPS) which detects the rotational angle of the torque motor and to ascertain the rotational angle of the torque motor at the time when a reaction force generation command is inputted from an upper device, as in the accelerator pedal apparatus of Japanese Patent Publication No. 2010-111379. Accordingly, there is a problem of high cost.

SUMMARY

In view of the above, the present disclosure provides an accelerator pedal apparatus capable of accurately controlling a torque motor without disposing MPS means which detects a rotational angle of the torque motor even when the torque motor is utilized as a drive source of an active control mechanism.

To address the above issue, the accelerator pedal apparatus according to the present disclosure is structured as follows.

The accelerator pedal apparatus includes a torque motor which generates operational reaction force corresponding to operation of an accelerator pedal, accelerator position detector which detects an accelerator opening rate of the accelerator pedal and outputs the accelerator opening rate to an upper device, and reaction force controller which applies the operational reaction force by controlling driving of the torque motor. Here, the reaction force controller applies the operational reaction force as controlling driving of the torque motor based on the accelerator opening rate when being commanded to apply the operational reaction force by the upper device.

Further, in the accelerator pedal apparatus, the reaction force controller may determine an estimated rotational angle of the torque motor based on the accelerator opening rate which is detected by the accelerator position detector and which performs control correction of driving of the toque motor based on the estimated rotational angle.

Further, in the accelerator pedal apparatus, the reaction force controller may not generate the operational reaction force without driving the toque motor when the accelerator opening rate which is detected by the accelerator position detector is a predetermined opening rate or lower.

Further, in the accelerator pedal apparatus, the accelerator position detector may be a sensor which outputs an accelerator position signal indicating the accelerator opening rate based on reference voltage and ground (GND) voltage supplied from the upper device. Then, the reference voltage, the ground voltage and the accelerator position signal are inputted to the reaction force controller as the accelerator opening rate, while at least one of the reference voltage, the ground voltage and the accelerator position signal is inputted to the reaction force controller via a high resistance.

Furthermore, the accelerator pedal apparatus may further include a GND offset which offsets voltage of the ground voltage to be inputted to the reaction force controller.

According to the present disclosure, when an upper device commands to apply operational reaction force, the reaction force controller is configured to apply operational reaction force by controlling driving of the torque motor based on the accelerator opening rate. Accordingly, the present disclosure provides an effect that the torque motor can be surely controlled without disposing means to detect the rotational angle of the torque motor. In addition, since the MPS is not utilized, it is possible to obtain an effect that cost is drastically reduced.

BRIEF DESCRIPTION OF THE DRAWINGS

These and/or other aspects and advantages will become apparent and more readily appreciated from the following description of the embodiments, taken in conjunction with the accompanying drawings of which:

FIG. 8 is a graph indicating relation between a rotational angle and motor torque of a torque motor.

DESCRIPTION OF EMBODIMENTS

Figure 1:
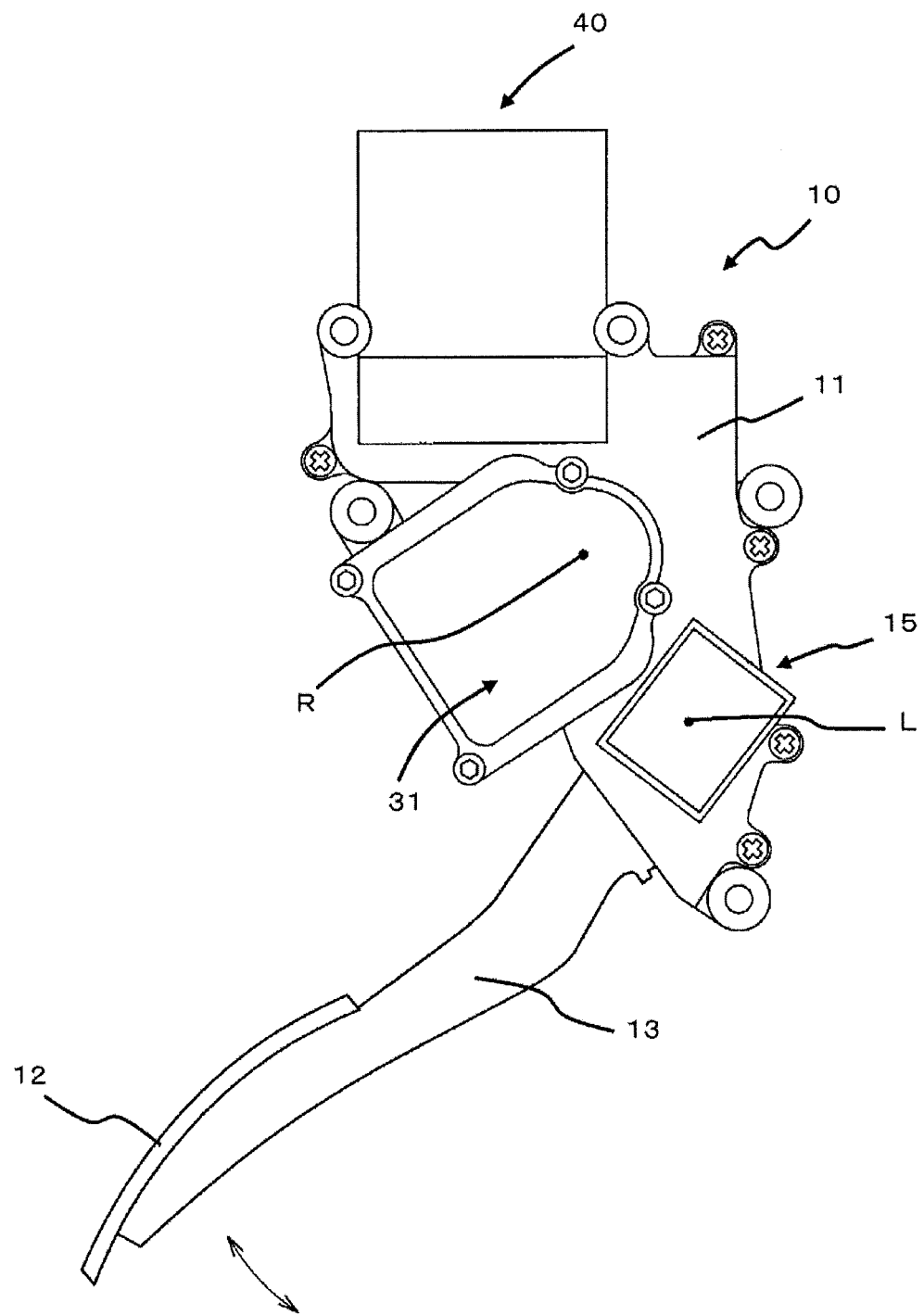
FIG. 1 is a side view illustrating a structure of the first embodiment of an accelerator pedal apparatus according to the present disclosure.

Reference will now be made in detail to the embodiments, examples of which are illustrated in the accompanying drawings, wherein like reference numerals refer to the like elements throughout. The embodiments are described below to explain the present disclosure by referring to the figures.

An accelerator pedal apparatus 10 of the first embodiment is an accelerator pedal apparatus applied for an electronic control throttle system (i.e., a drive-by-wire system), and includes a housing 11 which is attached to a vehicle body of an automobile and the like, a pedal arm 13 which is swingably supported by the housing 11 as having an accelerator pedal 12, a return spring 14 which applies operational reaction force by applying urging force to return the pedal arm 13 to a rest position, a hysteresis generating mechanism 20 which generates hysteresis at the operational reaction force, an accelerator pedal position sensor (APS) 15 which detects a rotational angle of the pedal arm 13 as an accelerator opening rate due to operation of the accelerator pedal 12 and which outputs the detected accelerator opening rate to an engine control unit (ECU) 50 being an upper device as an APS signal, an active control mechanism 30 which varies the operational reaction force corresponding to the operation of the accelerator pedal 12 by generating adjustment force, and a control unit (i.e., a control board) 40 which applies the operational reaction force corresponding to the operation of the accelerator pedal 12 by generating the adjustment force as controlling the active control mechanism 30 based on the adjustment force (i.e., operational reaction force) generation command which is inputted from the ECU 50 via a controller area network (CAN) communication line.

The APS 15 is a position sensor which detects the rotational angle of the pedal arm 13 as the accelerator opening rate as being arranged around a swing axis L of the pedal arm 13 and is requested to accurately detect the rotational angle of the pedal arm 13. In the present embodiment, description is performed on an example which adopts a non-contact type magnetic sensor which detects the rotational angle of the pedal arm 13 as the accelerator opening rate by detecting variation of magnetic flux with a Hall element, as illustrated in FIGS. 1 to 3.

The APS 15 is a key component for transmitting accelerator operation to the ECU 50 as functioning as the accelerator position detector which detects the accelerator opening rate of the accelerator pedal 12 and outputs the accelerator opening rate to the ECU 50. Accordingly, the APS 15 is configured to be directly controlled by the ECU 50 being the upper device. That is, as illustrated in FIG. 3, reference voltage and ground voltage (GND voltage) are supplied from the ECU 50 to the APS 15, so that the Hall element of the APS 15 is driven at constant voltage by the ECU 50. Further, the APS signal outputted from the APS 15 is a voltage signal outputted in accordance with magnetic flux density and is directly inputted to the ECU 50 not via the control unit 40. Accordingly, troubles will not occur with the operation even in a case that the control unit 40 malfunctions.

Figure 2:
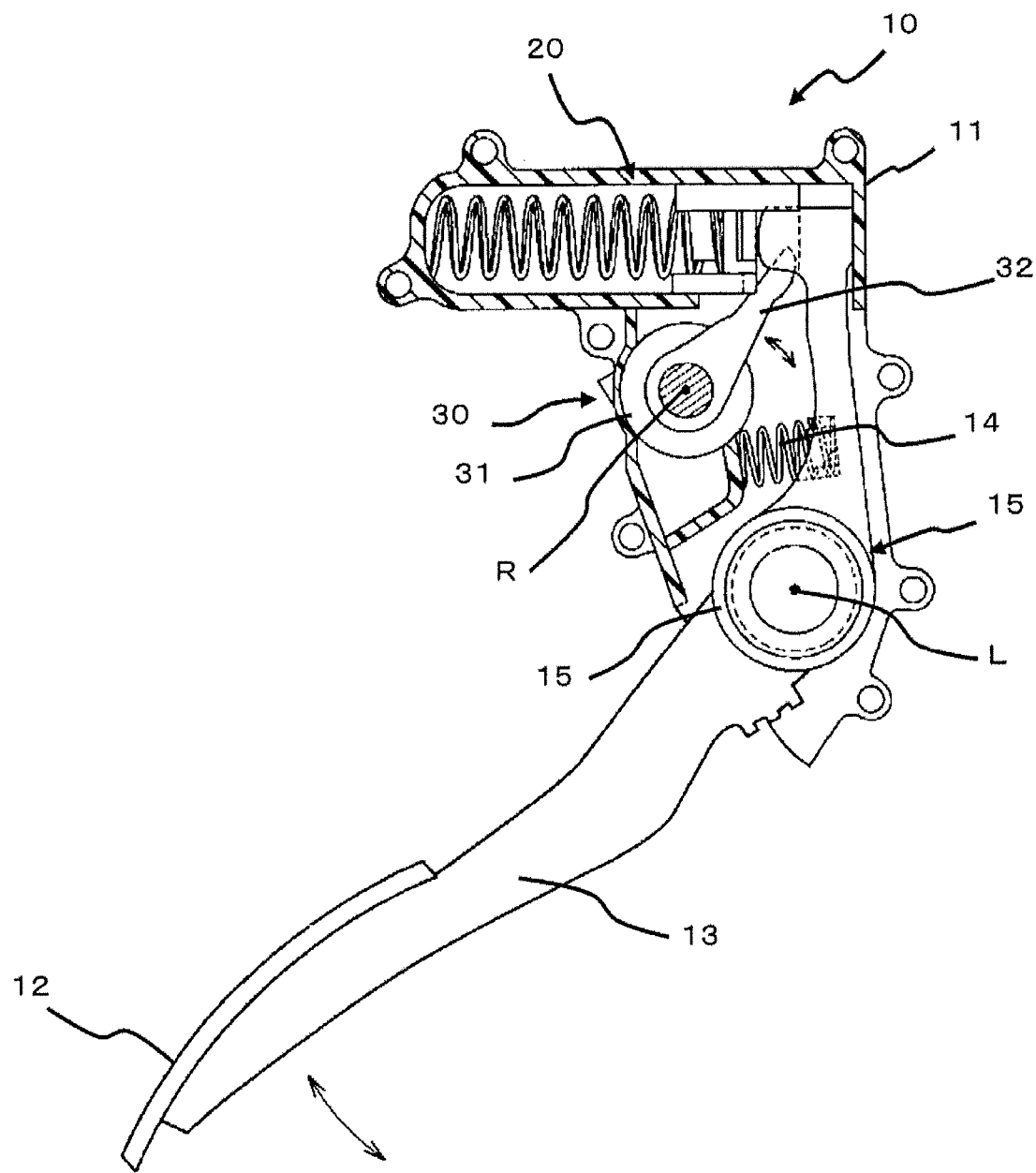
FIG. 2 is a side view illustrating an internal structure of the first embodiment of the accelerator pedal apparatus according to the present disclosure.
Figure 3:
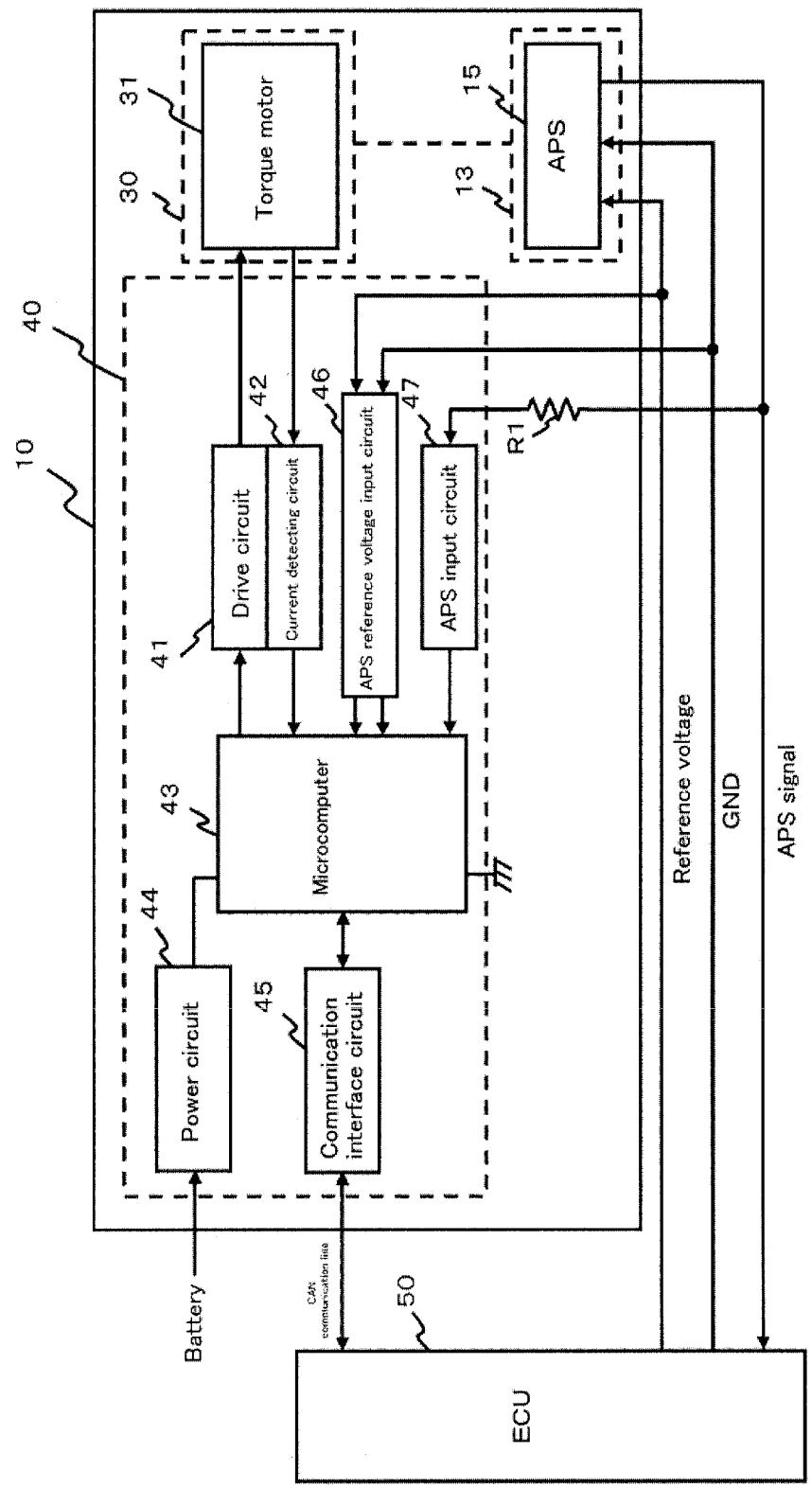
FIG. 3 is a schematic block diagram illustrating a structure of the first embodiment of the accelerator pedal apparatus according to the present disclosure.
Figure 4:
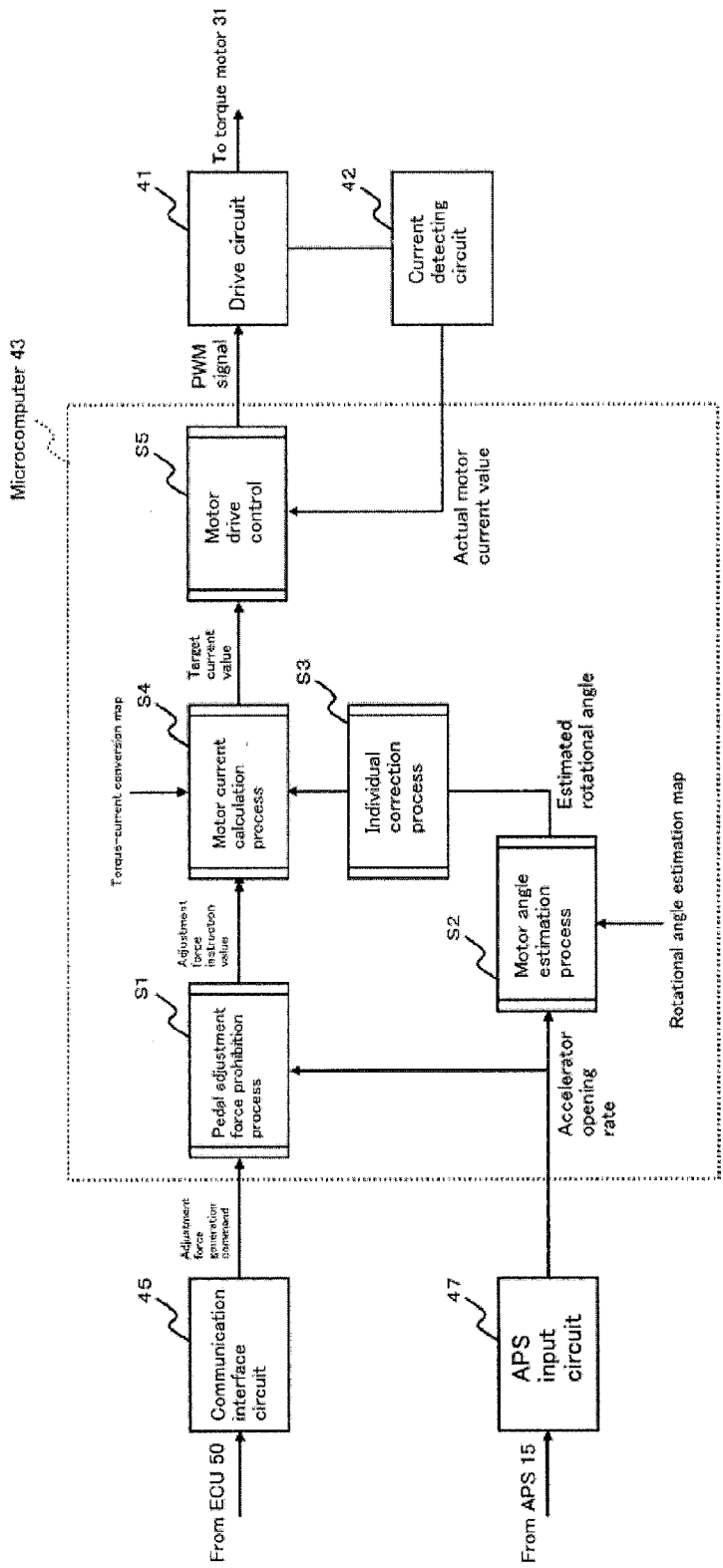
FIG. 4 is a data-flow diagram for describing operation of the first embodiment of the accelerator pedal apparatus according to the present disclosure.

As illustrated in FIG. 2, the active control mechanism 30 includes a torque motor 31 of which rotational shaft R is arranged at a position being different from the swing axis L of the pedal arm 13, and a return lever 32 which applies the adjustment force (i.e., the operational reaction force) as being attached to the rotational shaft R of the torque motor 31 and abutted to the pedal arm 13. The torque motor 31 functions as a drive source to generate the adjustment force (i.e., the operational reaction force). Even when the torque motor 31 does not apply motor torque (i.e., operational force), the rotational shaft R of the torque motor 31 is rotated while the return lever 32 follows swinging of the pedal arm 13 owing to a magnetic spring action due to a magnet (not illustrated) arranged at the torque motor 31. On the other hand, when applying motor torque (i.e., operational force), the torque motor 13 is configured to apply the adjustment force (i.e., the operational reaction force) to the pedal arm 13 in the direction to push-back toward the rest position.

The control unit 40 functions as reaction control means which applies the operational reaction force by controlling driving of the torque motor 31. As illustrated in FIG. 3, the control unit 40 includes a drive circuit 41 which drives the torque motor 31 with a PWM signal, a current detecting circuit 42 which detects an actual motor current value being a value of current actually flowing through the torque motor 31, a microcomputer 43 which controls generation of the adjustment force (i.e., the operational reaction force) due to the torque motor 31 being the drive source, a power circuit 44 which supplies electric power from a battery (not illustrated) to the microcomputer 43, a communication interface circuit 45 being an interface circuit which is connected to the CAN communication line, an APS reference voltage input circuit 46 which supplies the reference voltage and the GND voltage which are supplied to the APS 15 from the ECU 50 to the microcomputer 43, and an APS input circuit 47 which inputs the APS signal outputted from the APS 15 to the microcomputer 43.

The microcomputer 43 receives the APS signal via the APS input circuit 47 and receives the GND voltage and the reference voltage being comparison reference to the APS signal which is a voltage signal via the APS reference voltage input circuit 46. Accordingly, the acceleration opening rate detected by the APS 15 is accurately inputted.

Here, the APS input circuit 47 is connected via a resistance R1 to a communication line which outputs the APS signal to the ECU 50 from the APS 15, so that the APS signal being a voltage signal is inputted via the resistance R1. The resistance R1 having a high resistance value is arranged to suppress negative effects to the APS signal outputted from the APS 15 to the ECU 50 being the upper device even when malfunction occurs at the control unit 40 side of the accelerator pedal apparatus 10. Here, it is arranged that the influence to the APS signal falls within an accuracy range required for the ECU 50 even when the signal at the control unit 40 side of the accelerator pedal apparatus 10 is grounded or the power source thereof is shorted.

Next, adjustment force generating operation in the accelerator pedal apparatus 10 of the first embodiment will be described with reference to FIGS. 3 to 6.

When detecting excessive closing to a preceding vehicle owing to an output of a distance sensor (not illustrated) which detects a distance against the preceding vehicle in front thereof or determining worsening of fuel consumption with further depression of the accelerator pedal 12 based on determination of drive conditions (e.g., engine revolution, vehicle speed and load), the ECU 50 outputs the adjustment force generation command to the accelerator pedal apparatus 10 via the CAN communication line. Here, the adjustment force generation command includes a value of the adjustment force (i.e., the operational reaction force) to be generated by the active control mechanism 30 as an adjustment force instruction value.

The adjustment force generation command inputted to the accelerator pedal apparatus 10 via the CAN communication line is inputted to the microcomputer 43 via the communication interface circuit 45 of the control unit 40. The microcomputer 43 to which the adjustment force generation command is inputted determines, based on the accelerator opening rate, whether or not a pedal adjustment force prohibition process S1 is performed.

Figure 5A:
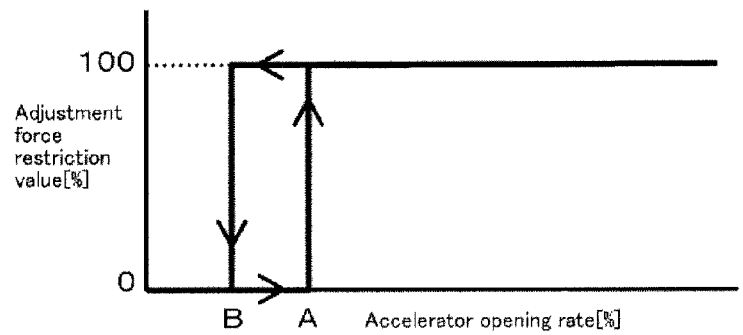
FIG. 5 is an explanatory view for describing a pedal adjustment force prohibition process (i.e., an operational reaction force prohibition process) to be executed by a microcomputer illustrated in FIG. 3.

The pedal adjustment force prohibition process S1 is a process not to generate the adjustment force (i.e., the operational reaction force) even when the adjustment force generation command is inputted from the ECU 50. The pedal adjustment force prohibition process S1 is performed when the position of the accelerator pedal 12, that is, the accelerator opening rate is within an adjustment force prohibition area. As illustrated in FIG. 5A, the adjustment force prohibition area is defined by prohibition threshold values being different between a depression direction and a return direction of the accelerator pedal 12. The prohibition threshold value in the return direction of the accelerator pedal 12 is set to be smaller than the prohibition threshold value in the depression direction of the accelerator pedal 12. That is, the prohibition threshold values are different corresponding to the movement direction of the accelerator pedal 12. Specifically, in the depression direction of the accelerator pedal, that is, in the direction that the accelerator opening rate is increased, the adjustment force prohibition area is set as being below a predetermined threshold value A %. Meanwhile, in the return direction of the accelerator pedal 12, that is, in the direction that the accelerator opening rate is decreased, the adjustment force prohibition area is set as being below a predetermined threshold value B %. Here, the threshold value B % is smaller than the threshold value A %.

Figure 5B:
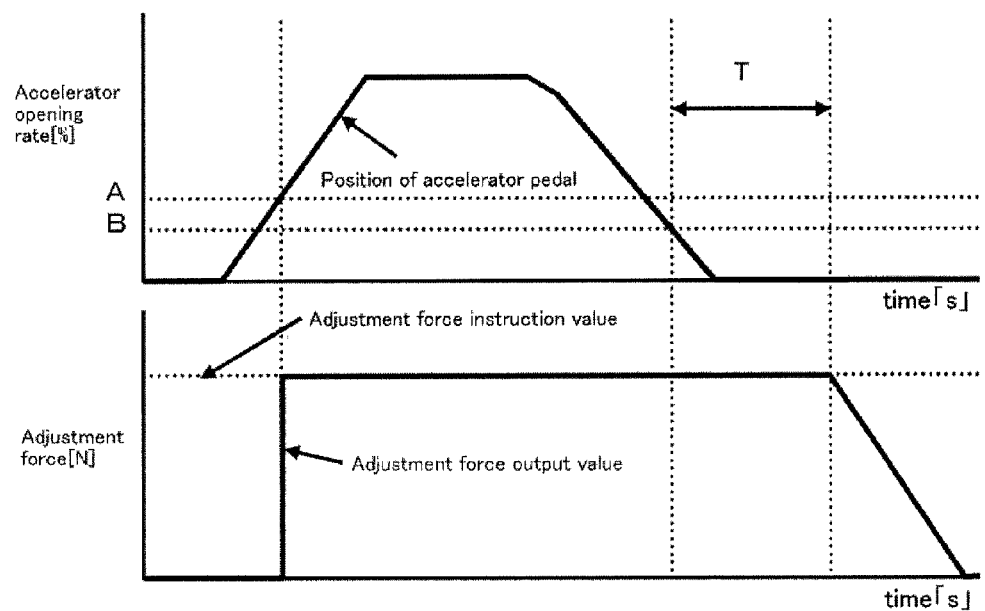

Accordingly, as illustrated in FIG. 5B, when the accelerator pedal 12 is depressed from 0% in a state that the adjustment force generation command is inputted, the adjustment force (i.e., the operational reaction force) is not generated with execution of the pedal adjustment force prohibition process S1 until the accelerator opening rate exceeds the threshold value A %. Then, when the accelerator opening rate exceeds the threshold value A %, the adjustment force (i.e., the operational reaction force) is to be generated in accordance with the adjustment force instruction value of the adjustment force generation command.

Here, even when the accelerator opening rate becomes within the adjustment force prohibition area as being below the threshold value B % in the direction of returning the accelerator pedal 12, that is, in the direction that the accelerator opening rate is decreased after exceeding the threshold value A %, generation of the adjustment force (i.e., the operational reaction force) is not stopped immediately. That is, when the state that the accelerator opening rate is below the threshold value B % continues for a predetermined time T (s) as illustrated in FIG. 5B, the adjustment force is controlled to be decreased to 0 (N) at a predetermined gradient in the direction that the accelerator opening rate is decreased. In this manner, by decreasing the adjustment force at the predetermined gradient, accelerator pedal fluttering being likely to occur at a low opening rate which is to be in the pedal adjustment force prohibition area can be prevented.

The pedal adjustment force prohibition process S1 as described above is performed by the control unit 40 of the accelerator pedal apparatus 10. Accordingly, ECU 50 can determine timing to provide the adjustment force generation command based on factors other than the accelerator opening rate without caring the accelerator opening rate, so that load of the ECU 50 can be lightened.

Figure 6:
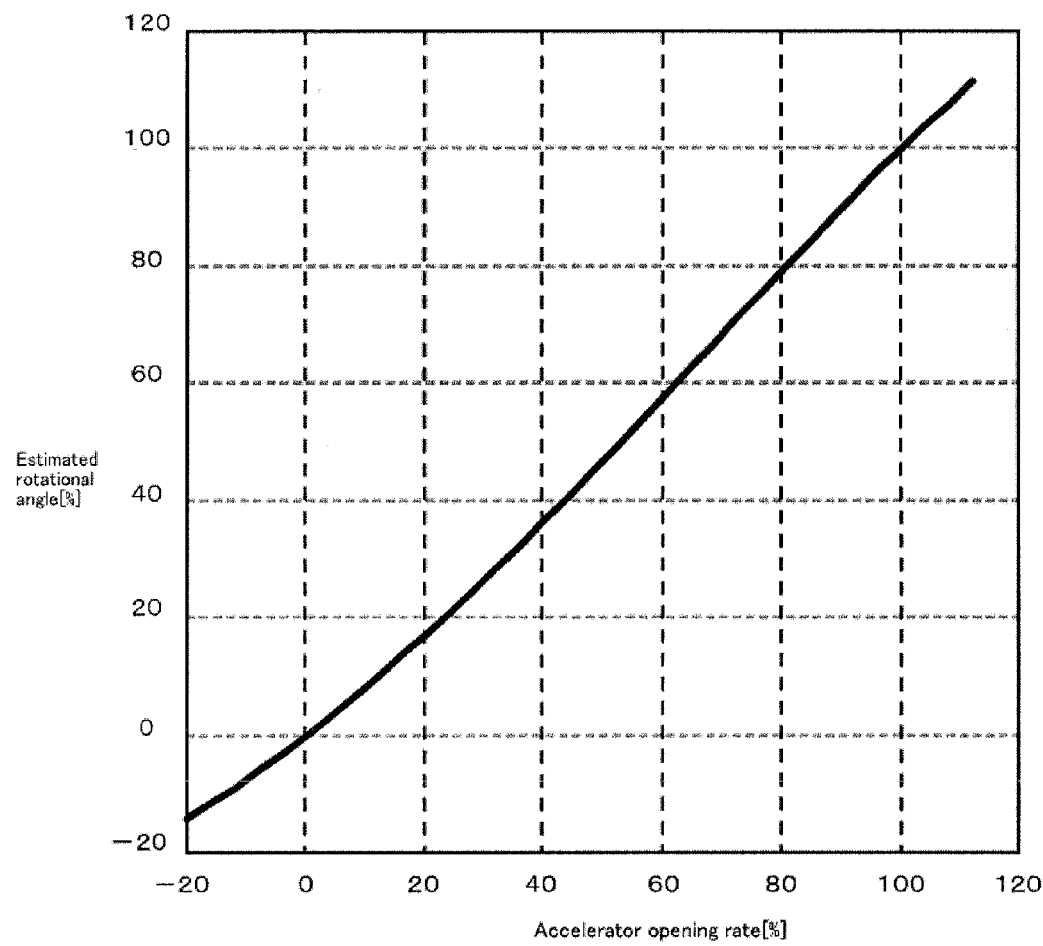
FIG. 6 is a graph indicating an example of a rotational angle estimation map which is utilized for a motor angle estimation process to be executed by the microcomputer illustrated in FIG. 3.

Further, the microcomputer 43 to which the adjustment force generation command is inputted performs a motor angle estimation process S2 to calculate an estimated rotational angle which is estimated as a rotational angle of the torque motor 31 based on the accelerator opening rate inputted from the APS 15. A rotational angle estimation map associating the accelerator opening rate with the estimated rotational angle as illustrated in FIG. 6 is previously stored in the microcomputer 43. As the motor angle estimation process S2, the microcomputer 43 calculates the estimated rotational angle of the torque motor 31 from the inputted accelerator opening rate as utilizing the rotational angle estimation map. Not only at the timing when the adjustment force generation command is inputted, the motor angle estimation process S2 may be performed continuously.

The estimated rotational angle calculated at the motor angle estimation process S2 is corrected to be an estimated rotational angle having individual variation of the accelerator pedal apparatus 10 corrected at an individual correction process S3. In the individual correction process S3, deviation between a motor angle position and an accelerator opening rate position individually occurs when assembling the accelerator pedal apparatus 10 is previously detected and a correction value is determined corresponding to the detection value. The estimated rotational angle calculated at the motor angle estimation process S2 is corrected based on the correction value.

The estimated rotational angle calculated at the individual correction process S3 indicates the rotational angle of the torque motor 31 corresponding to the accelerator opening rate. In the active control mechanism 30, even when the torque motor 31 applies motor torque (i.e., operational force), the rotational shaft R of the torque motor 31 is rotated while the return lever 32 follows swinging of the pedal arm 13 owing to the magnetic spring action due to the magnet included in the torque motor 31. Accordingly, the rotational angle of the torque motor 31 and the accelerator opening rate detected by the APS 15, that is, the rotational angle of the pedal arm 13 are synchronized. Then, the rotational angle of the torque motor 31 can be estimated from the accelerator opening rate. In this manner, it is possible to detect the rotational angle of the torque motor 31.

In a case that the pedal adjustment force prohibition process S1 is determined not to be performed while the acceleration opening rate is not within the adjustment force prohibition area when the adjustment force generation command is inputted, the microcomputer 43 performs a motor current calculation process S4 to calculate a target current value for driving the torque motor 31. The microcomputer 43 previously stores the adjustment force instruction value of the adjustment force generation command and a torque-current conversion map associating a current value applied to the torque motor 31 to obtain the adjustment force instructed by the adjustment force instruction value with the estimated rotational angle of the torque motor 31. The microcomputer 43 calculates the target current value to be applied to the torque motor 31 from the adjustment force instruction value of the adjustment force generation command by utilizing the torque-current conversion map as the motor current calculation process S4.

The target current value calculated in the motor current calculation process S4 is compared in motor drive control S5 with an actual current value of the torque motor detected by the current detection circuit 42. By performing the motor drive control S5, the difference between the target current value and the actual current value is calculated to be a PWM signal as a current value required to be applied to the torque motor 31. Further, in the motor drive control S5, comparison is performed between actual battery voltage being current power voltage and reference battery voltage and the PWM signal is outputted to the drive circuit 41 after being corrected in accordance with the actual battery voltage.

The torque motor 31 is driven by inputting PWM signal as the required current value to the drive circuit 41 from the microcomputer 43 and performs feedback control with the actual motor current value detected by the current detection circuit 42, so that the target motor torque is generated. Accordingly, the adjustment force (i.e., the operational reaction force) corresponding to the adjustment force instruction value of the adjustment force generation command is generated and driver's attention is drawn with variation of the operational reaction force against operation of the accelerator pedal 12.

In the first embodiment, the accelerator opening rate detected by the APS 15 is directly inputted to the control unit 40 from the APS 15 not via the ECU 50. Here, it is also possible that the accelerator opening rate is inputted to the control unit 40 from the ECU 50 via the CAN communication line. However, when the accelerator opening rate is inputted to the control unit 40 from the ECU 50 via the CAN communication line, the response is worsened owing to back and forth transmission of the accelerator opening rate between the accelerator pedal apparatus 10 and the ECU 50. Therefore, it is preferable to configure to input the accelerator opening rate directly to the control unit 40 from the APS 15, as the first embodiment. Further, in the first embodiment, since the accelerator opening rate is utilized for the active control, the processes are completed within the accelerator pedal apparatus 10 as being ideal as a system. Further, since the accelerator opening rate is directly inputted to the control unit 40 from the APS 15, the system can be prevented from being complicated. Further, the accelerator opening rate inputted to the ECU 50 is transmitted to the accelerator pedal apparatus 10 through the CAN communication while the accelerator opening rate is directly inputted to the control unit 40 from the APS 15, and then, comparison is performed between both of the accelerator opening rates. Accordingly, it is possible to perform a failure determination process to determine whether or not the accelerator opening rate is correctly detected.

Figure 7:
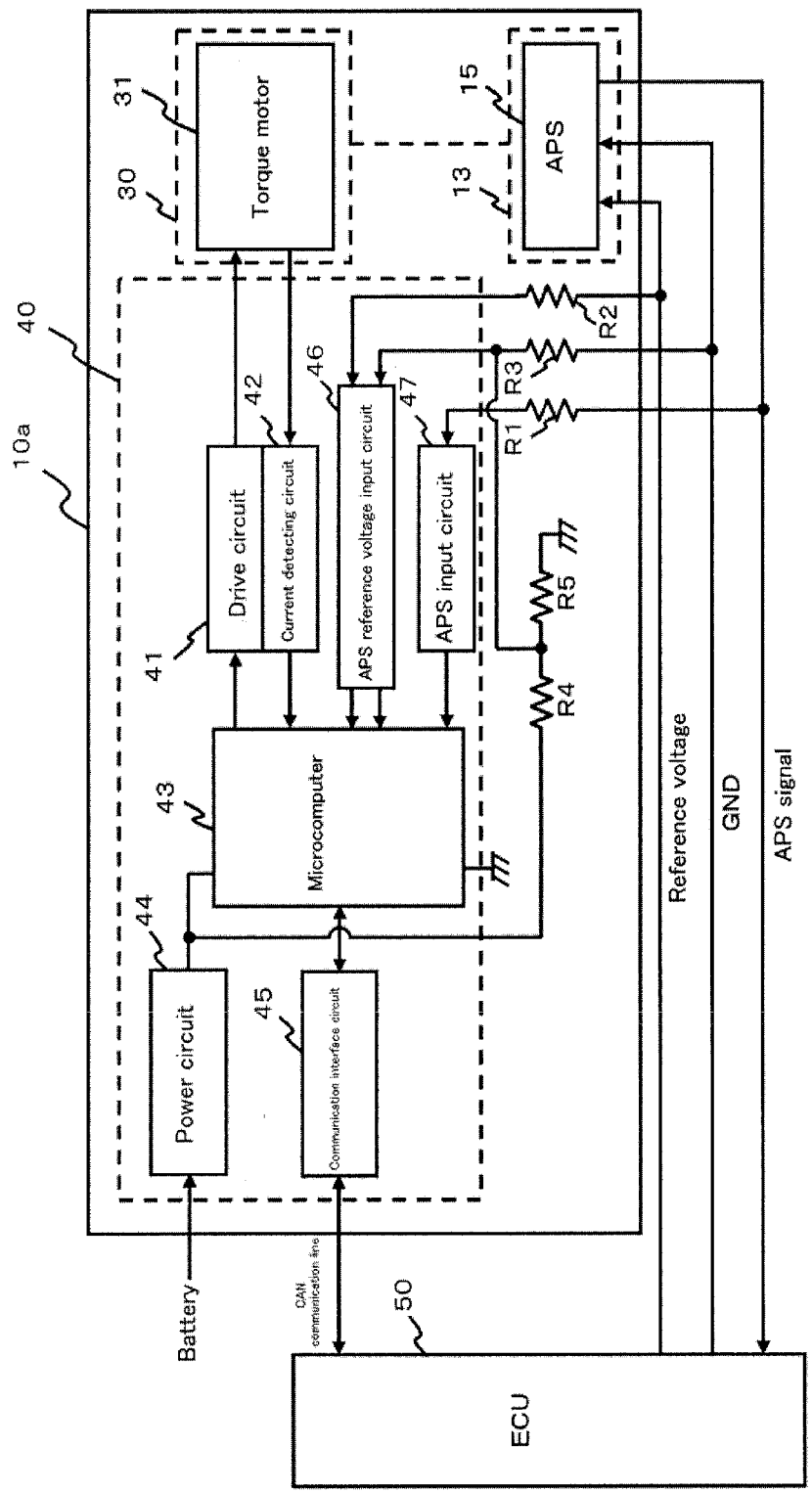
FIG. 7 is a schematic block diagram illustrating a structure of the second embodiment of the accelerator pedal apparatus according to the present disclosure.

Next, the second embodiment of the present disclosure will be described with reference to FIG. 7.

An accelerator pedal apparatus 10a of the second embodiment differs from the first embodiment in that the reference voltage to be supplied from the ECU 50 to the APS 15 and the GND voltage to be supplied from the ECU 50 to the APS 15 are supplied to the APS reference voltage input circuit 46 respectively via a resistance R2 and a resistance R3 and that the GND voltage to be inputted to the APS reference voltage input circuit 46 is corrected by utilizing a resistance R4 and a resistance R5.

The APS reference voltage input circuit 46 is connected via the resistance R2 to a power line through which the reference voltage is supplied from the ECU 50 to the APS 15, so that the reference voltage is supplied via the resistance R2. Further, the APS input circuit 47 is connected via the resistance R3 to a GND line through which the GND voltage is supplied from the ECU 50 to the APS 15, so that the GND voltage is supplied via the resistance R3. The resistance R2 and the resistance R3 respectively having a high resistance value are arranged to suppress influence to the APS signal outputted from the APS 15 to the ECU 50 being the upper device even when malfunction occurs at the control unit 40 side of the accelerator pedal apparatus 10a. Here, it is arranged that the influence to the APS single falls within an accuracy range required for the ECU 50 even when the power line and the GND line are shorted in the control unit 40 of the accelerator pedal apparatus 10a.

Further, one end of the resistance R4 is connected to a power line which supplies power from the power circuit 44 to the microcomputer 43. The other end of the resistance R4 is connected to one end of the resistance R5 of which other end is grounded. Further, a connection point between the resistance R4 and the resistance R5 is connected to a connection point between the resistance R3 and the APS reference voltage input circuit 46. With the above, the resistance R4 and the resistance R5 function as GND offset means which offsets the GND voltage to be inputted to the APS reference voltage input circuit 46, so that the GND voltage to be inputted to the APS reference voltage input circuit 46 is corrected. Accordingly, even when the GND voltage is deviated to the negative side, the GND voltage can be offset to the positive side. Therefore, even in a case that an A/D converter mounted in the microcomputer 43 cannot input the GND voltage of the negative side, the GND voltage can be surely measured.

Here, the present disclosure is not limited to the above embodiments. It is obvious that each embodiment can be appropriately modified within the technical scope of the present disclosure. Further, numbers, positions, shapes and the like of the above structural members are not limited to the above embodiments. It is possible to adopt appropriate numbers, positions, shaped and the like for actualizing the present disclosure.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. An accelerator pedal apparatus, comprising:
   a torque motor which generates operational reaction force corresponding to operation of an accelerator pedal;
   an accelerator position detector which detects an accelerator opening rate of the accelerator pedal and outputs the accelerator opening rate to an upper device; and
   a reaction force controller which is in communication with the upper device, the reaction force controller applying the operational reaction force by controlling driving of the torque motor,
   wherein the reaction force controller applies the operational reaction force as controlling driving of the torque motor based on the accelerator opening rate when being commanded to apply the operational reaction force by the upper device, and
   wherein the reaction force controller determines an estimated rotational angle of the torque motor based on the accelerator opening rate which is detected by the accelerator position detector and which performs control correction of driving of the torque motor based on the estimated rotational angle.

2. The accelerator pedal apparatus according to claim 1, wherein the reaction force controller does not generate the operational reaction force without driving the toque motor when the accelerator opening rate which is detected by the accelerator position detector is a predetermined opening rate or lower.

3. The accelerator pedal apparatus according to claim 1, wherein the accelerator position detector is a sensor which outputs an accelerator position signal indicating the accelerator opening rate based on reference voltage and ground (GND) voltage supplied from the upper device, and the reference voltage, the ground voltage and the accelerator position signal are inputted to the reaction force controller as the accelerator opening rate, while at least one of the reference voltage, the ground voltage and the accelerator position signal is inputted to the reaction force controller via a high resistance.

4. The accelerator pedal apparatus according to claim 3, further comprising a GND offset which offsets voltage of the ground voltage to be inputted to the reaction force controller.

5. An accelerator pedal apparatus, comprising:
   a torque motor which generates operational reaction force corresponding to operation of an accelerator pedal;
   an accelerator position detector which detects an accelerator opening rate of the accelerator pedal and outputs the accelerator opening rate to an upper device and to a reaction force controller which applies the operational reaction force by controlling driving of the torque motor,
   wherein the reaction force controller applies the operational reaction force as controlling driving of the torque motor based on the accelerator opening rate directly inputted from the accelerator position detector when being commanded to apply the operational reaction force by the upper device, and wherein the reaction force controller determines an estimated rotational angle of the torque motor based on the accelerator opening rate which is directly inputted by the accelerator position detector and which performs control correction of driving of the torque motor based on the estimated rotational angle.

6. The accelerator pedal apparatus according to claim 5, wherein the accelerator position detector is a sensor which outputs an accelerator position signal indicating the accelerator opening rate based on reference voltage and ground (GND) voltage supplied from the upper device, and
   the reference voltage, the ground voltage and the accelerator position signal are inputted to the reaction force controller as the accelerator opening rate, while at least one of the reference voltage, the ground voltage and the accelerator position signal is inputted to the reaction force controller via a high resistance.

7. The accelerator pedal apparatus according to claim 6, further comprising a GND offset which offsets voltage of the ground voltage to be inputted to the reaction force controller.

* * * * *